United States Patent
Hamrelius et al.

(10) Patent No.: US 7,332,716 B2
(45) Date of Patent: Feb. 19, 2008

(54) IR CAMERA

(75) Inventors: Torbjörn Hamrelius, Sollentuna (SE); Tom Scanlon, Hampstead, NH (US)

(73) Assignee: Flir Systems AB, Danderyd (SE)

(*) Notice: Subject to any disclaimer, the term of this patent is extended or adjusted under 35 U.S.C. 154(b) by 203 days.

(21) Appl. No.: 11/144,890

(22) Filed: Jun. 6, 2005

(65) Prior Publication Data
US 2007/0034798 A1 Feb. 15, 2007

(51) Int. Cl.
G01J 5/00 (2006.01)
(52) U.S. Cl. .................. 250/332; 250/339.05
(58) Field of Classification Search ........... 250/332, 250/339.01, 339.05
See application file for complete search history.

(56) References Cited

U.S. PATENT DOCUMENTS

| 6,606,115 B1* | 8/2003 | Alicandro et al. .......... 348/164 |
| 2005/0089076 A1 | 4/2005 | Lindstrom et al. |
| 2005/0115873 A1 | 6/2005 | de Villers et al. |

FOREIGN PATENT DOCUMENTS

| DE | 33 06 460 | 8/1984 |
| DE | 195 20 035 | 11/1996 |
| WO | 94/03817 | 2/1994 |

OTHER PUBLICATIONS

Anonymous: GTS160-Super-Kompakte IR-Kamera, XP002407995, retrieved from the Internet: URL:http://web.archive.org/web/20050305100 820/http://www.trotec.de/>(retrieved on Mar. 5, 2005).
Anonymous: Die neue ThermaCAM B20 - speziell entwickelt für die anspruchsvolle, professionelle Gebäudeinspektionen, XP002407996, retrieved from the Internet: URL:http://www.innovations-report.de/html/berichte/verfahrenstechnologie/bericht-360 26.html> (retrieved on Jun. 10, 2004).

* cited by examiner

*Primary Examiner*—David Porta
*Assistant Examiner*—Mark R Gaworecki
(74) *Attorney, Agent, or Firm*—Young & Thompson

(57) ABSTRACT

An IR camera for recording and presenting a thermal image of an object includes optical receiving elements for focusing infra-red radiation received from the object onto a focal plane array and processing elements for receiving and processing the data from the focal plane array to form a thermal image, presentation elements for presenting the thermal image and storage elements for storing the thermal image. The IR camera further includes receiving elements for receiving from at least one humidity sensor arranged to provide humidity information, information about the humidity in a least one measuring point on the object, and forwarding the humidity information to the processing elements, the processing elements the processing elements being arranged to include the humidity information in the thermal image. In this way the camera can directly identify any points on the object where there is risk for damp.

33 Claims, 2 Drawing Sheets

IR CAMERA

TECHNICAL FIELD

The present invention relates to a thermal IR camera having functions for detecting humidity.

BACKGROUND

IR cameras may be used for detecting increased humidity, for example, in part of a building. Calculations based on the temperature in different parts of an IR image can be used to point out areas in the building having an increased risk of damages caused by damp. However, measurements based only on temperature are not always reliable.

Other means for humidity detection are known, for example, conductivity sensors. Such sensors are typically moved across an object where humidity is to be detected and react when the humidity in a measurement point exceeds a predetermined threshold value. These measurements are very reliable but are time consuming and cannot be stored for later display in a suitable way.

The aim of the present invention is to provide an apparatus for humidity detection that is improved compared to the prior art.

SUMMARY OF THE INVENTION

The object is achieved according to the invention by a IR camera for recording and presenting a thermal image of an object, said camera comprising optical receiving means for focusing infra-red radiation received from the object onto a focal plane array and processing means for receiving and processing the data from the focal plane array to form a thermal image, presentation means for presenting the thermal image and storage means for storing the thermal image, said IR camera further comprising receiving means for receiving from at least one humidity sensor arranged to provide humidity information, information about the humidity in at least one measuring point on the object, and forwarding said humidity information to a calculating means, said calculating means being arranged to include said humidity information in the thermal image.

In this way any areas of the object in which there is a risk of damage due to humidity can be identified directly in the thermal image presented by the camera.

In a preferred embodiment the IR camera itself comprises at least one humidity sensor for providing said humidity information. The humidity sensor may be a pin-type moisture meter utilizing the principle of electrical resistance. This type of humidity sensor uses wood or other hygroscopic material as an element in a circuit by driving two pins or electrodes into it. Alternatively, the humidity sensor may be a pinless moisture meter using radio frequency signals to penetrate the material being tested. Of course any type of humidity sensor fit to be included in an IR camera can be used.

If the IR camera does not comprise a humidity sensor, the receiving means are arranged to receive said humidity information from an external humidity sensor.

The IR camera may also comprise a laser pointer for pointing out, for a first point of interest in the thermal image, a corresponding point on the object.

In this case, the IR camera may further comprise calculation means for calculating a first position in said thermal image for said first point of interest and based on the first position calculate at least one further position for at least one further point of interest in the image, said points of interest corresponding to points on the object in which measurements in which the humidity is measured. Said presentation means is then preferably arranged to present the measured humidity information in said points of interest in the thermal image.

The presentation means may be arranged to present the humidity information from said at least one measuring point on the object in the thermal image by including in the image a position marker indicating the position of the measuring point and a number indicating the value of the humidity information in said measuring point.

Preferably the IR camera also comprises image processing means arranged to assign a range of colours to the humidity information, wherein said presenting means is arranged to present the humidity information as a humidity image using range of colours. The range of colours used for the humidity information is preferably different from the range of colours used for the thermal image, in which case the humidity information can be superimposed on the thermal image.

The humidity image can also be superimposed on a visual image of the object taken with a photographic camera and provided to the calculating means or a digitized version of a drawing provided to the calculating means. This will facilitate the identification of the different parts of the object in the humidity image.

The presentation means may also be arranged to present information about the time of the recording and/or the location of the recording in the image.

In a preferred embodiment the IR camera also comprises calculating means for performing calculations that diagnose the building's structural condition.

In this case means may be provided for receiving ambient humidity information about a relative humidity in the air near the IR camera, said calculating means being arranged to take said ambient humidity information into account when performing said calculations.

Preferably the IR camera comprises means for measuring said ambient humidity in the air near the IR camera and providing it to the receiving means.

Preferably the IR camera comprises means for receiving information about a temperature in the air near the IR camera, said calculating means being arranged to take said temperature into account when performing said calculations.

The means for measuring said temperature in the air near the IR camera is preferably arranged to provide it to the receiving means.

BRIEF DESCRIPTION OF THE DRAWINGS

The present invention will be described in more detail in the following, with reference to the appended drawings, in which.

DETAILED DESCRIPTION OF EMBODIMENTS

Figure 1:
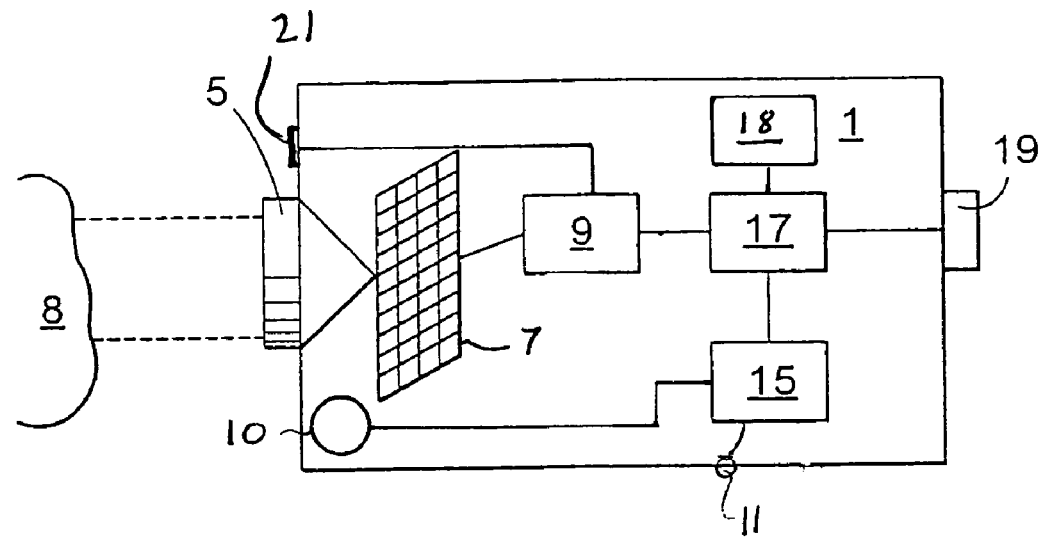
FIG. 1 shows a first preferred embodiment of an IR camera according to the invention.

FIG. 1 illustrates a first preferred embodiment of an inventive IR camera 1. As is common in IR cameras, the inventive IR camera comprises a lens 5 for focusing incoming IR radiation onto a focal plane array 7. A processing means 9 receives the data from the focal plane array 7 and processes it to obtain a thermal image.

In this embodiment a humidity sensor 10, such as a conductivity sensor, is provided within the camera housing. The camera also comprises one or more input terminals 11 for receiving information from one or more external sensors. These external sensors 11 can be arranged to measure the ambient temperature and/or the air humidity near the camera 1. The humidity information from the humidity sensor 10 is received in a receiving means 15 and forwarded to a calculating means 17. Depending on the format of the humidity information received from the humidity sensor the receiving means 15 may also perform calculations on the humidity information to facilitate its inclusion in the image. The calculating means 17 also receives the thermal image from the processing means 9 and is arranged to superimpose the humidity information onto the thermal image. The thermal image having the humidity information superimposed on it may be stored in a storage unit 18 and/or displayed in a display unit 19. Of course, the thermal image without the humidity information may also be stored and displayed.

Different ways of superimposing the humidity information on the image will be discussed below.

The camera may also comprise a laser pointer 21 arranged to emit a beam of light towards the object. Preferably, the laser pointer 21 is arranged to emit the beam of light so that it will mark the point on the object corresponding to the centre of the thermal image recorded by the camera. The laser pointer 21 communicates with the processor 9 and can be used to determine the point in the image to which a certain measurement on the object relates.

Figure 2:
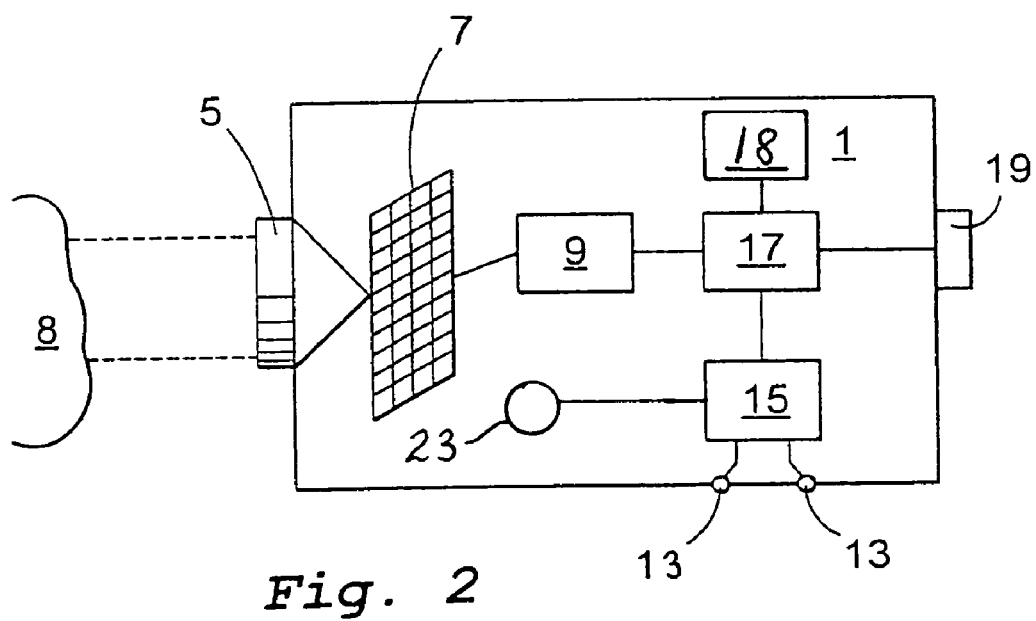
FIG. 2 shows a second preferred embodiment of an IR camera according to the invention.

FIG. 2 shows a second embodiment. For elements that are the same as in FIG. 1, the same reference numerals are used. In this case, the camera does not comprise an internal humidity sensor. Instead, the camera comprises input means 13 for receiving humidity information from at least one humidity sensor that is used to measure the humidity on the surface of the object. As in FIG. 1, the humidity information is provided to a receiving means 15 and from there to a calculating means 17.

FIG. 2 also shows a further sensor 23 included in the camera for measuring the ambient temperature and/or the air humidity near the camera. The data from the further sensor 23 is provided to the receiving means 15, which optionally performs calculations on the data and on the humidity information received from the humidity sensors.

As in FIG. 1, the image data received through the lens 5 and the focal plane array 7 are processed in the processing means 9. The resulting thermal image is received in the calculating means 17 which also receives the information from the various sensors 10, 23 and input terminals 11, 13, from the receiving means 15 and superimposes them on the thermal image. The thermal image having the humidity information superimposed on it may be stored in a storage unit 18 and/or displayed in a display unit 19. Of course, the thermal image without the humidity information may also be stored and displayed.

If the camera comprises a laser pointer 21 the laser pointer can be used when matching a measurement to the correct position in the image. The simplest way of implementing this would be to arrange the camera in such a way that the laser beam points at the measurement point while the measurement result is being communicated to the camera. In this way, the point in the image to which a measurement result relates can be determined. For example, it may be known that the point where the laser beam hits the object coincides with the centre of the image.

A more complex procedure would be to define several points by their position relative to the point indicated by the laser beam. In this way, for example, a matrix of points having a predefined distance between them could be defined on the object and a corresponding matrix in the image. The laser beam could be used to point out one of these points, preferably the centre or a corner of the matrix. Then measurements could be performed in each point of the matrix in a predetermined order.

An alternative way of determining the point in the image that corresponds to a particular measurement would be to use a sensor probe comprising a position sensing device that would communicate its position to the camera for each measurement performed on the object and communicated to the camera.

The point in the image corresponding to a particular measurement could also be identified by using a sensor probe having properties that will allow it to be identified in the thermal image. For example, a number of heat sources, typically three heat sources may be arranged in a predetermined pattern so as to be identifiable in the thermal image. In this case, the processing means 9 can identity the position of the measuring point at the same time as data from the measuring point is received. The position identified in this way can be used to include the measuring data in the correct point of the image.

The humidity information can be superimposed on the thermal image in several different ways. One way would be, for each measuring point on the object, to mark the corresponding point in the image, for example, by a cross, and state the humidity in that point as a number adjacent the cross. The corresponding points can be identified in one of the ways discussed above.

Alternatively, the humidity range can be assigned a colour range in the same way as is generally done for the temperature range when generating a thermal image. In this case, different colour ranges should be used for humidity and temperature. For example, the thermal image may be presented in shades of grey while the different colours are used to mark humidity. In this way, different levels of humidity can be colour coded, using red for levels indicating an increased risk of damage. The skilled person is aware of several ways of assigning such colour ranges.

In the same ways as discussed above for thermal images, the humidity information can be superimposed on a visible image or a drawing of the object in digital form.

As is common in the art, information about date and time, and of the location where the images were recorded, can be included in the image or stored in association with the image. Other types of data, such as sound recordings can also be stored in association with the image.

The calculating unit may also be arranged to perform calculations to diagnose the building's structural conditions. The ambient temperature and/or air humidity information received from input terminal 11 or internal sensor 23 can be used by the calculating unit when performing these calculations.

As the skilled person will understand, the division into functional units in the cameras shown in FIGS. 1 and 2 is intended for illustration only. The functional units can be combined so that, for example, the functions of the processing means 9 and the calculating means 17 are performed in one unit, or that all calculations are performed in the calculating means 17, which could then receive humidity information and other information directly from the humidity sensors 10 or input means 11, 13. Further, elements from the two embodiments can be combined so that, for example a laser pointer 21 as shown in FIG. 1 is included in the embodiment of FIG. 2, or a temperature and/or air humidity sensor 23 is included in the embodiment of FIG. 1. Of course, the laser pointer 21 can be omitted in FIG. 1, and the internal sensors 23 can be omitted in FIG. 2.

Figure 3:
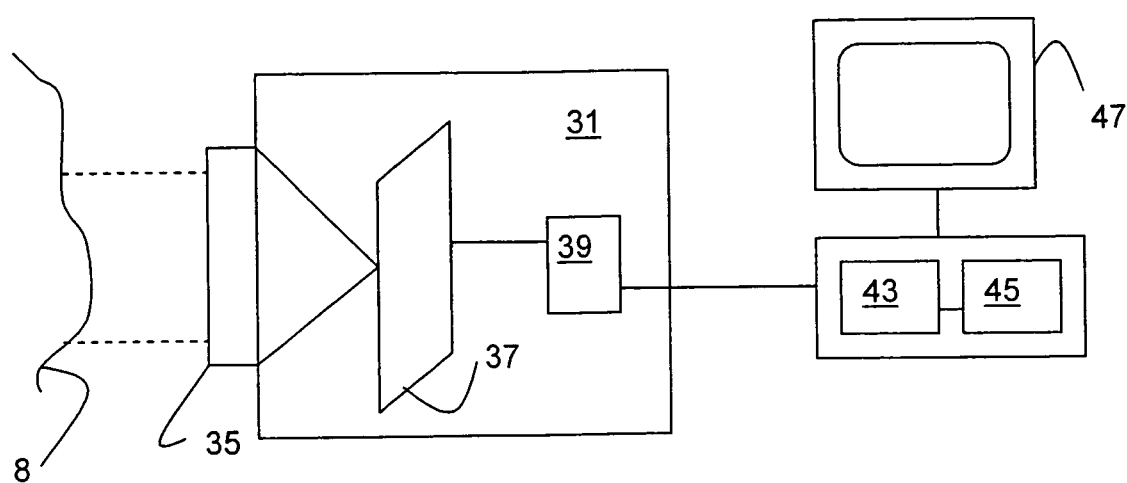
FIG. 3 shows an IR camera cooperating with a computer according to the invention.

In the embodiment shown in FIG. 3, again an IR camera 31 is used to record the thermal image of an object 8. A simplified diagram of the IR camera is shown, comprising a lens 35 for focusing incoming IR radiation onto a focal plane array 37. A processing means 39 receives the data from the focal plane array 37 and processes it to obtain thermal image data. The thermal image data are then transferred to a computer 41, such as a personal computer. The computer 41 is also arranged to receive the same types of humidity information and temperature information as above. The information received, as well as the processed images are stored in a memory means 43. A calculating means 45 in the computer 41 is arranged to perform the humidity calculations performed in the previous embodiments by the calculating means 17 in the camera. In this embodiment the IR camera may be the IR camera as shown in FIG. 1 or 2, further arranged to communicate with the computer, or an IR camera that does not itself have the functions for receiving and processing humidity information. How to transfer data from an IR camera to a computer is well known in the art. The computer preferably comprises a display 47 in which the image can be displayed.

The humidity information may also be superimposed on a visual image of the same object. Including the humidity information in a photograph of the object will make it easier to identify the different parts of the object. This function can be included in each of the embodiments above. The IR camera may also comprise a visible light camera that may provide the images, or digital photographs taken with a separate camera may be entered into the memory unit 18 of the camera or the memory unit of the computer, as the case may be.

The invention claimed is:

1. An IR camera (1) for recording and presenting a thermal image of an object (8), said camera comprising:

optical receiving means (5) for focusing infra-red radiation received from the object onto a focal plane array (7);

processing means (9) for receiving and processing the data from the focal plane array (7) to form a thermal image;

presentation means (19) for presenting the thermal image;

storage means (18) for storing the thermal image;

receiving means (15) for receiving information about the ambient temperature and/or air humidity from one or more external sensors; and at least one internal humidity sensor (10) or external humidity sensor arranged to provide information about the humidity in at least one measuring point on the object (8) based on an electrical property of the object, and forwarding said humidity information to a calculating means (17;45), said calculating means being arranged to include said humidity information in the thermal image.

2. The IR camera according to claim 1, further comprising at least one input means (11) for providing humidity information.

3. The IR camera according to claim 1, wherein said at least one internal humidity sensor (10) or external humidity sensor is a pin moisture meter utilizing the principle of electrical resistance.

4. The IR camera according to claim 1, wherein said at least one internal humidity sensor (10) or external humidity sensor is a pinless moisture meter using radio frequency signals to penetrate the material being tested.

5. The IR camera according to claim 1, wherein said receiving means (15) is arranged to receive said humidity information from an external humidity sensor.

6. The IR camera according to claim 1, further comprising a laser pointer (21) for pointing out, for a first point of interest in the thermal image, a corresponding point on the object.

7. The IR camera according to claim 6, further comprising calculation means (17) for calculating a first position in said thermal image for said first point of interest and based on the first position calculate at least one further position for at least one further point of interest in the image, said points of interest corresponding to points on the object in which measurements in which the humidity is measured.

8. The IR camera according to claim 7, wherein said presentation means (19) are arranged to present the measured humidity information in said points of interest in the thermal image.

9. The IR camera according to claim 1, wherein said presentation means (19) are arranged to present the humidity information from said at least one measuring point on the object in the thermal image by including in the image a position marker indicating the position of the measuring point and a number indicating the value of the humidity information in said measuring point.

10. The IR camera according to claim 1, further comprising calculating means (17) arranged to assign a range of colors to the humidity information, and said presentation means (19) is arranged to present the humidity information as a humidity image using said range of colors.

11. The IR camera according to claim 10, wherein said presentation means (19) is arranged to present the humidity image superimposed on the thermal image, on a visual image of the object or on a drawing of the object.

12. The IR camera according to claim 1, further comprising calculating means (17) for performing calculations that diagnose the object's structural condition.

13. The IR camera according to claim 12, wherein said receiving means (15) receives ambient humidity information about a relative humidity in the air near the IR camera, and wherein said calculating means (17) is arranged to take said ambient humidity information into account when performing said calculations.

14. The IR camera according to claim 13, further comprising means (13) for measuring said ambient humidity in the air near the IR camera and providing it to the receiving means.

15. The IR camera according to claim 1, wherein said receiving means (15) receives information about a temperature in the air near the IR camera, and wherein said calculating means (17) is arranged to take said temperature into account when performing said calculations.

16. The IR camera according to claim 15, further comprising means (13) for measuring said temperature in the air near the IR camera and providing it to the receiving means (15).

17. A method for humidity detection in an object (8), comprising the following steps:

recording a thermal image of the object (8) using a thermal camera for recording and presenting a thermal image of an object (8), said camera comprising optical receiving means (5) for focusing infra-red radiation received from the object onto a focal plane array (7) and processing means (9) for receiving and processing the data from the focal plane array (7) to form a thermal image;

measuring the ambient temperature and/or air humidity in the air near the camera;

measuring the humidity in at least one measuring point on the object (8) using at least one internal humidity sensor (10) or external humidity sensor based on at least one electrical property of the object; and processing the humidity information and the thermal image to calculate an image including said humidity information.

18. The method according to claim 17, wherein said processing device (9) is the processing device (9) of the camera.

19. The method according to claim 17, wherein the processing device (9) is a processing device in a computer such as a personal computer.

20. The method according to claim 17, wherein said at least one internal humidity sensor (10) or external humidity sensor is a pin moisture meter utilizing the principle of electrical resistance.

21. The method according to claim 17, wherein said at least one internal humidity sensor (10) or external humidity sensor is a pinless moisture meter using radio frequency signals to penetrate the material being tested.

22. The method according to claim 17, further comprising using a laser pointer (21) for pointing out, for a first point of interest in the thermal image, a corresponding point on the object.

23. The method according to claim 22, further comprising calculating a first position in said thermal image for said first point of interest and based on the first position calculating at least one further position for at least one further point of interest in the image, said points of interest corresponding to points on the object in which measurements in which the humidity is measured.

24. The IR camera according to claim 23, wherein a presentation means (19) is arranged to present the measured humidity information in said points of interest in the thermal image.

25. The method according to claim 17, further comprising the step of presenting the humidity information from said at least one measuring point on the object in the thermal image by including in the image a position marker indicating the position of the measuring point and a number indicating the value of the humidity information in said measuring point.

26. The method according to claim 17, further comprising the steps of assigning a range of colors to the humidity information, and presenting the humidity information using said range of colors.

27. The method according to claim 26, further comprising the step of presenting the humidity information superimposed on the thermal image.

28. The method according to claim 26, further comprising the steps of receiving a visual image of the object and presenting the humidity information superimposed on the visual image.

29. The method according to claim 17, further comprising the step of performing calculations that diagnose a building's structural condition.

30. The method according to claim 29, further comprising receiving ambient humidity information about a relative humidity in the air near the IR camera, and taking said ambient humidity information into account when performing said calculations.

31. The method according to claim 29, further comprising measuring said ambient humidity in the air near the IR camera and taking said ambient humidity into account when performing said calculations.

32. The method according to claim 29, further comprising receiving information about a temperature in the air near the IR camera, and taking said temperature into account when performing said calculations.

33. A computer program product comprising a computer readable medium, having thereon computer readable program means which, when run in a processing device, causes the processing device to perform the following steps:

receiving a thermal image recorded by a thermal camera for recording and presenting a thermal image of an object (8), said camera comprising optical receiving means (5) for focusing infra-red radiation received from the object onto a focal plane array (7) and processing means (9) for receiving and processing the data from the focal plane array (7) to form a thermal image;

receiving information about the humidity in at least one measuring point on the object (8) using at least one internal humidity sensor (10) or external humidity sensor based on an electrical property of the object;

receiving information about the ambient temperature and/or air humidity from one or more external sensors;

processing the humidity information and the thermal image to present an image including said humidity information; and presenting said humidity information in a presentation means.

* * * * *